E. J. BAKER.
SPRING WHEEL.
APPLICATION FILED JAN. 29, 1912.
1,183,336.
Patented May 16, 1916.
2 SHEETS—SHEET 2.
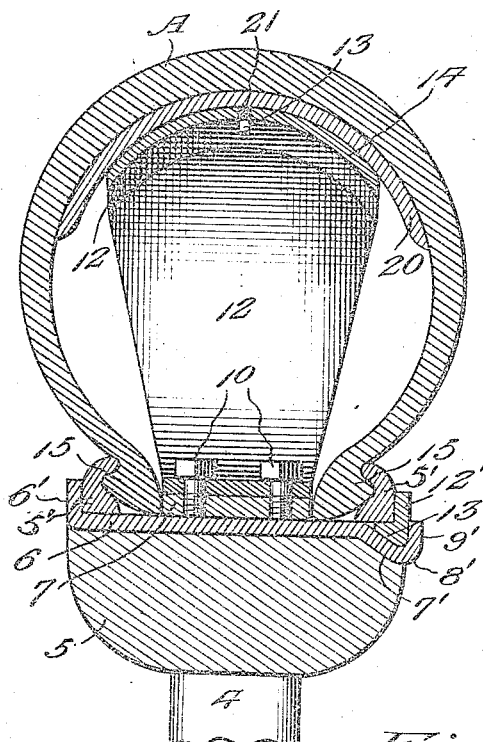
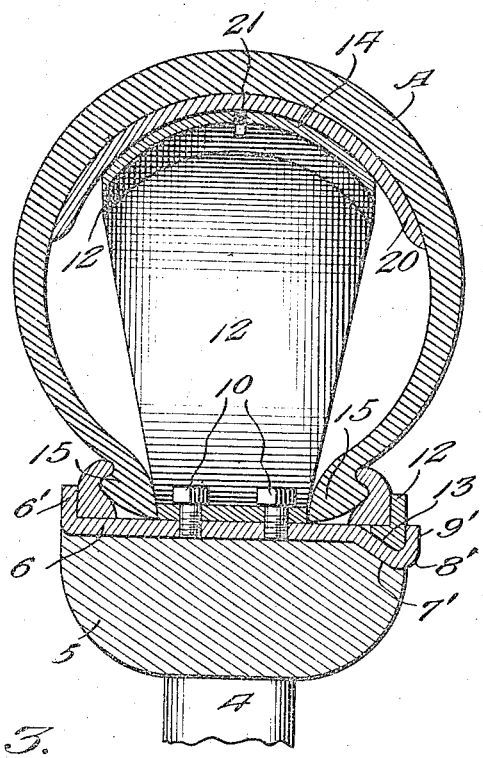
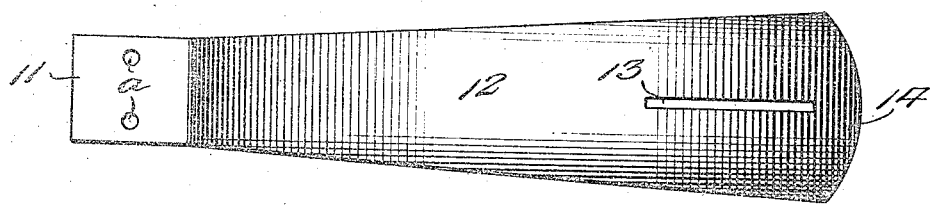
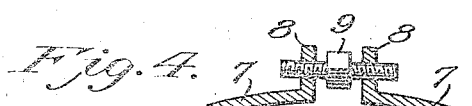
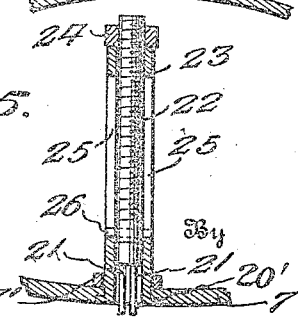
Witnesses
Edwin F. McKee
Alfred L. Seiler
Inventor
Edwin J. Baker
By George W. Sues.
Attorney

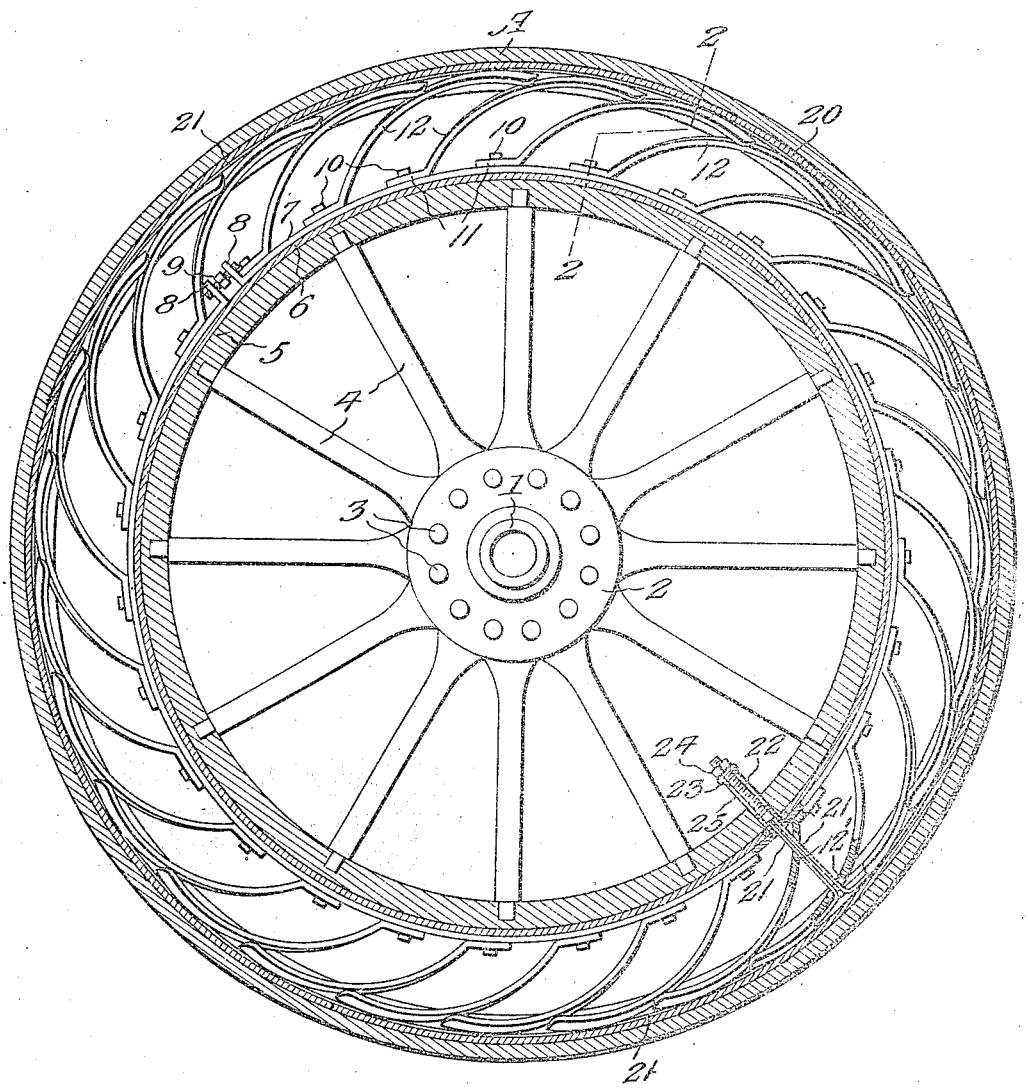

UNITED STATES PATENT OFFICE.

EDWIN J. BAKER, OF PITSBURG, OHIO.

SPRING-WHEEL.

1,183,336.  Specification of Letters Patent.  Patented May 16, 1916.

Application filed January 29, 1912. Serial No. 674,010.

*To all whom it may concern:*

Be it known that I, EDWIN J. BAKER, a citizen of the United States, and a resident of Pitsburg, in the county of Darke and State of Ohio, have invented certain new and useful Improvements in Spring-Wheels, of which the following is a specification, reference being had to the accompanying drawings.

This invention has relation to certain new and useful improvements in spring wheels adapted to be used in connection with automobiles, motorcycles, and vehicles in general; and the object of my invention is to provide a wheel of this general character, of a simple and durable construction which shall be elastic and yielding and be so constructed that the various parts may be easily and readily replaced in case of damage or fracture.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views: Figure 1, is a view partly in section of a wheel embodying my invention. Fig. 2, is a section on line 2, 2, of Fig. 1. Fig. 3, shows an enlarged detached detail looking from above upon one of the bowed leaf springs as used in my invention. Fig. 4, is a fragmentary view partly in section, showing the means by which the ends of the tire band are connected. Fig. 5, shows an enlarged detached detail of the tension mechanism used to draw the cable encompassing the springs while securing the outer casing. Fig. 6, shows a cross sectional view of a modification in which the band 7, is eliminated.

In my present invention I aim to provide a wheel having a spring tire which will be sufficiently resilient so that the same may be used in connection with pleasure vehicles such as automobiles, carriages and the like.

In the accompanying drawings the numeral 1 designates the axle box and 2 the hub of a suitable wheel. The spokes are shown at 4 and are arranged to fit into the felly 5. This felly 5 is provided with a rim 6. This rim may be of any approved type arranged to detachably receive a rubber outer casing A, as shown in Figs. 2 and 6. In the drawings a well-known type of tire is shown having an outstanding flange 6' along one edge and a downwardly curved flange 7', having the curved portion 8', ending in the flange 9', suitable keys 12' being used in connection with the flange 9'. This rim forms no part of my invention.

Secured to the rim band 7 are a plurality of bowed leaf springs which are disposed in spaced relation, as shown in Fig. 1. Each bowed leaf spring 12 has a flat apertured attaching ear 11, shown in Fig. 3, the apertures $a$, of which are arranged to receive the bolts 10 by means of which the springs are secured to the rim band 7. The ears 11 are of width equal to that of the rim band. As shown in Fig. 2, this rim band is of such a width so that the beads 15, forming part of a suitable outer casing A, can be conveniently held between the securing flanges 5' and the rim band. These securing flanges 5' are arranged to be used in connection with the rim 6 and forms no part of my invention, as any suitable means may be used to secure the outer casing A, which may be of any conventional or usual construction.

The bowed springs 12 are of decreasing width toward the ear end, as shown in Fig. 3, the outer or moving ends 14 of the springs being also transversely curved, as will be understood in referring to Figs. 2 and 6, and located near the broad curved end of each spring is the metal lengthwise running slot 13, this construction being clearly shown in the drawings. When the springs are secured to the tire band, as shown in Fig. 1, the transversely curved end of one spring contacts with the spring in advance at a point intermediate of the ends of the spring in advance, the end of each spring 12 being so curved that one spring will snugly fit upon the upper curved face of the adjacent spring in front. The springs 12 give support to a resilient band 20, shown in Figs. 2 and 6, this band being curved and being made of leather, rubber or any other suitable material. As shown, this resilient band 20 is interposed between the springs 12 and the inner face of the outer casing A.

In order to secure the outer casing to the wheel, the springs must be depressed, and this I accomplish in providing the tire band 7 with a slotted sleeve 23, shown in enlarged detail in Fig. 5, which extends inwardly through the felly, as shown in Fig. 1. This sleeve has a base flange 20', shown in Fig. 5, at one end working in conjunction with the nut 17', so that this sleeve 23 may be securely held to the metal tire band 7.

Slidably held within the sleeve 23 is the threaded stem 22, having the outstanding lugs 26 slidably held within the slots 25 of the sleeve, the nut 24 threading upon the stem 22, in the manner shown in Fig. 5. A cable 21 has its ends securely fastened within the threaded stem 22 and this cable encompasses the wheel and is held within the slots 13 of the springs, as is shown in Figs. 1 and 2, for instance. In turning the nut 24 so that the stem 22 is drawn inward, the circumference of the cable is reduced, so that the springs 12 are all compressed. While in their compressed condition, the outer casing A, can be detached or replaced. Further, any single spring can also be removed or replaced. As shown in Fig. 1, two of the springs must be provided with slots 12', through which the ends of the cable pass.

In order that the tire band 7 may be securely held to the wheel, I provide the same with the threaded ears 8, and held within these threaded ears is a bolt 9 threaded in an opposite direction. Any suitable number of springs 12 may be used.

When the cable is released, the springs 12 are yieldingly held to the shield 20, so that the tire A, offers a resilient tread for the wheel.

In Fig. 6, the tire band 7 has been shown as removed, the springs being directly secured to the wheel tire 6. Even though the tire A becomes worn, the resiliency of the wheel is not impaired.

The wheel is further simple and comparatively inexpensive in construction, and both durable and efficient in operation, and the adjustment of the springs and the securing of the casing to the tire may be effected with ease, accuracy and despatch.

Having thus described my said invention, what I claim as new and desire to secure by United States Letters Patent is:

The combination with the felly of a wheel, of a plurality of bowed leaf springs each having a flat apertured attaching ear at one end and being transversely curved at the opposite end each spring decreasing in width toward the ear end, a middle lengthwise running slot being provided near the broad curved end of each spring, screws within said apertures to secure said ears to said felly in spaced relation, a threaded slotted sleeve extending inwardly through said felly, a threaded stem slidably held within said sleeve with a lug guided within the slot of said sleeve, a nut upon the inner end of said stem, and a cable encompassing said wheel and held within the slots of said springs having its ends secured to said stem, the transversely curved end of one spring contacting with the spring in advance at a point intermediate of the ends of the spring, as and in the manner set forth.

In testimony whereof I affix my signature, in presence of two witnesses.

EDWIN J. BAKER.

Witnesses:
 ED. HAMMEL,
 IRA O. YOUNG.